United States Patent Office 3,269,464
Patented August 30, 1966

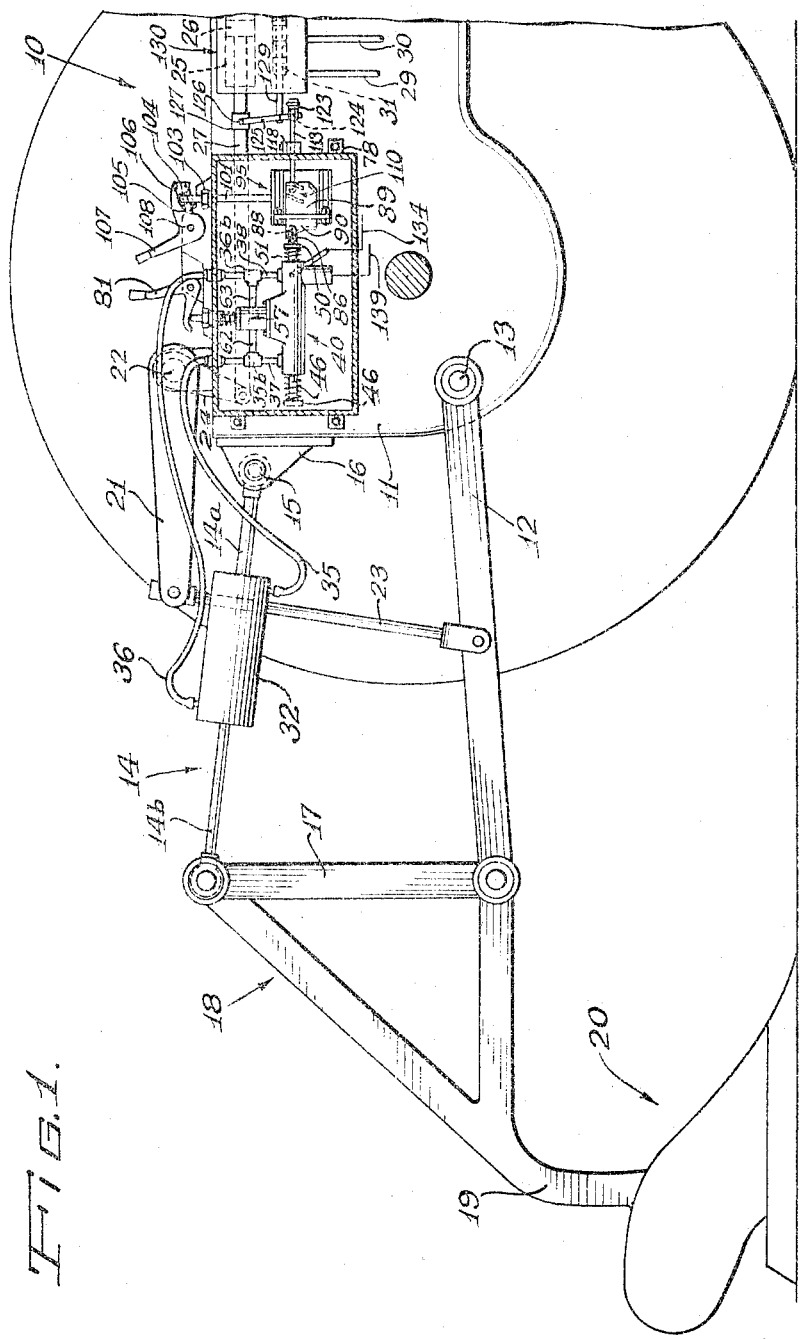

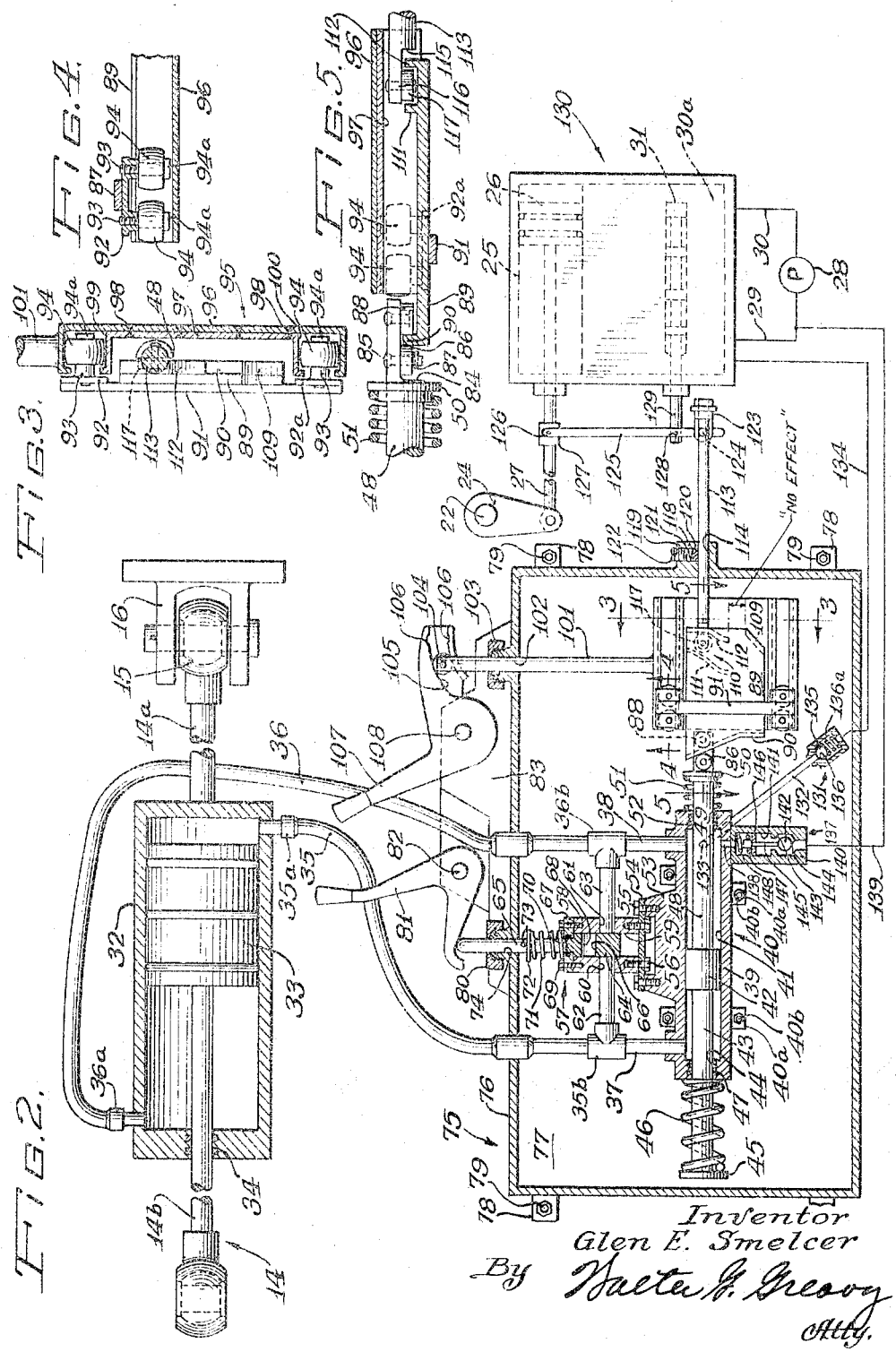

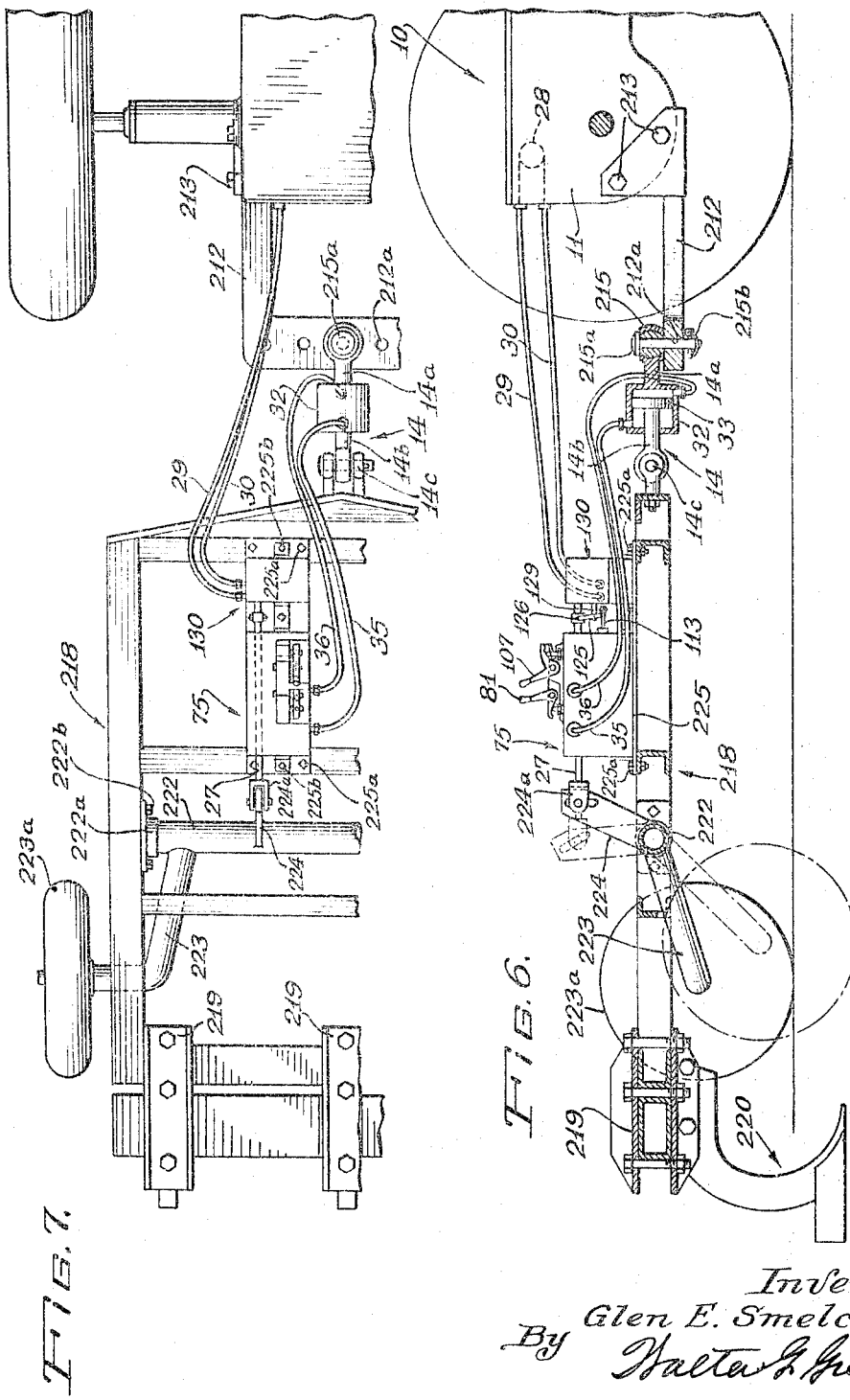

3,269,464
IMPLEMENT CONTROL MEANS FOR TRACTOR
OPERATED AGRICULTURAL IMPLEMENTS
Glen E. Smelcer, Hinsdale, Ill., assignor to International
Harvester Company, Chicago, Ill., a corporation of
New Jersey
Original application July 24, 1963, Ser. No. 297,296.
Divided and this application June 23, 1965, Ser.
No. 466,179
9 Claims. (Cl. 172—10)

The present application is a division of my co-pending application Serial No. 297,296 filed July 24, 1963 for Implement Control Means for Tractor Operated Agriculture Implements. This invention relates to implement control systems for tractor operated implements, but more particularly to improvements in implement depth control mechanisms employed therewith.

Implement depth control mechanisms for tractors operating agricultural implements are well known and, heretofore, have been offered in a wide variety of arrangements of apparatus and assemblies. Usually the control means in a mechanism of this character is adapted to respond to variations in the draft of an attached implement and attendant such accompanying change in draft to thereafter effect an adjustment in the operative relation of the implement to the soil. To accomplish this the system was designed to initially sense and then respond to variations in implement draft, resulting generally from a change in the soil characteristics in the immediate area of the implement in the ground, by effecting a raising or lowering of the implement as necessary to maintain it at a constant draft relative to the soil being worked. Heretofore such variations in draft on the implement have been sensed by mechanisms utilizing resilient means, usually in the form of springs associated with either of the links of the implement-attaching hitch mechanism, that were reactive for resisting compressive and tensive forces induced in the links by such draft changes and which reactions thereafter resulted in transmission via suitable linkage means of a signal to an actuator for raising and lowering the implement to conform with the changing draft demands.

In most of the prior mechanisms the linkage elements and particularly the pivotal mounting connections thereof were exposed to very severe dirt accumulation conditions which ultimately caused either a freeze-up of one or more of these connections or a fracture of some of the elements resulting from excess loads imposed by such conditions. Some of these linkage mechanisms also utilized adjustable means in the form of a turn-buckle assembly in the links and these likewise proved unsatisfactory because of a tendency to break or fracture. The above conditions also frequently caused the pivotal connections that carried the sensing linkage to become heavily loaded or to freeze-up or bind and thus considerably reduced the sensitivity of the sensing mechanism so that the signal finally transmitted to the actuator did not properly reflect the degree or magnitude of the draft change on the implement. Additionally, because of the difficulties of economically producing consistently good springs with identical reactive characteristics that were large enough to take the draft load, and because of the erratic frictional characteristics of the linkages when encumbered by the above accumulation hindrance, plus the space factor complications encountered on many conventional tractors, the prior solely spring type mechanisms have not been altogether satisfactory. An important feature of the present invention, therefore, is directed to providing an implement depth control mechanism that avoids the aforementioned earlier drawbacks inherent in prior mechanisms of this character, and concomitant therewith providing a more consistently reliable and sensitive mechanism.

The principal object of the present invention, therefore, is to provide new, improved and highly reliable draft sensing means for tractor vehicle-connected groundworking implements.

A general object is to provide an implement depth control mechanism wherein a draft sensing load creates a pressure differential in a hydraulic circuit which the mechanism effectively measures and subsequently converts a resultant measurement into a signal that operates actuator means to adjust the depth of the implement in the ground according to the draft load demands being sensed by the mechanism.

Another object is to provide draft-sensing means wherein hydraulic cylinder and piston means incorporated in a hitch linkage mechanism employed for connecting an agricultural implement to a tractor vehicle are operative, responsive to variations in draft loads on the implement, for actuating the vehicle's power lift means to effect a raising or lowering of the implement to conform with such changing draft demands, and wherein fluid make-up means are provided to maintain an adequate supply of fluid at all times during operation in the hydraulic circuit embracing said linkage mounted cylinder.

A further object is to provide for tractor-operated agricultural implements a novel implement control mechanism embodying an hydraulic draft-sensing means that is also operative to provide adjustment and control for the implements operated thereby, and which, because of the self-contained nature thereof additionally may be readily applied to and utilized with conventional tractor vehicles with a minimum of modification of the vehicle.

A still further object is the provision of a new and improved implement depth control mechanism embodying hydraulic draft-sensing means, and including therewith manually adjustable means for modifying the sensitivity of response of said mechanism to variations in draft loads being sensed by said mechanism.

An important object is to provide an improved draft-sensing mechanism wherein a hydraulic cylinder and piston, incorporated in and adapted to function as a portion of the linkage, of a hitch linkage mechanism employed for connecting an agricultural implement to a tractor, are operative for transmitting sensing signals to actuate a power lift mechanism associated with the tractor and which signals reflect attendant pressure differentials created between opposite ends of said hydraulic cylinder as a result of variations in the draft loads imposed on an associated implement.

A more specific object of the present invention is to provide implement control apparatus for tractor-connected agricultural implements wherein said apparatus includes hydraulic means that senses variations in draft loads on an attached implement and thereafter transmits actuating signals to a power lift means for adjusting the depth of the implement in the ground attendant said draft variations, and which apparatus additionally includes manually adjustable means adaptable means adaptable for overriding the signals of the hydraulic draft sensing means and incident thereto limiting the ability of said sensing means to control the operation of the power lift for adjusting the depth of the implement in the ground.

The foregoing and other objects and features of the invention will become apparent as the disclosure is more fully made in the following detailed description of a preferred embodiment of the invention as illustrated in the accompanying sheets of drawings in which:

FIGURE 1 is a fragmentary and generally diagrammatic view, partially in section, of a tractor equipped with an implement depth control system embodying the features of the invention;

FIGURE 2 is a generally schematic view, with portions thereof in section, showing the components embodied in the proposed implement control system, and including illustrated details of the means provided for adjusting the sensitivity of response of the draft sensing apparatus portion thereof;

FIGURE 3 is a vertical sectional view taken generally along the line 3—3 of FIGURE 2;

FIGURE 4 is a fragmentary horizontal sectional view taken generally along the line 4—4 of FIGURE 2;

FIGURE 5 is a fragmentary horizontal sectional view taken generally along the line 5—5 of FIGURE 2;

FIGURE 6 is a view generally similar to FIGURE 1 but showing a modified arrangement of the application of the invention; and FIGURE 7 is a fragmentary plan view of the modified arrangement shown in FIGURE 6.

Referring now to the drawings, it will be noted that the proposed implement control arrangement has been shown as applied to and utilized with a generally conventional type of tractor vehicle which vehicle is designated in its entirely by the reference numeral 10. The rear axle and differential housing frame portion 11 thereof, in this application of the device, has a pair of transversely spaced lower draft links 12 (only one of which appears in the drawings) universally pivoted thereto at 13, for movement, principally, in a vertical plane, and about axes located below the axis of the rear axle of the vehicle. A third or upper or top draft link 14 is pivotally connected through the universal pivot 15 and bracket 16 to the upper rear portion of housing frame 11. The lower and upper links 12, 14 extend rearwardly from the tractor and constitute one form of what is generally termed an implement attaching hitch or hitch linkage mechanism. At their outer ends the links are adapted for connection, respectively, with upper and lower portions of a vertically extending mast member 17 that may constitute a portion of an implement frame 18. The attached earthworking implement depicted herein is a plow and the frame 18 has extending downwardly therefrom a beamlike member 19 which supports the plow bottom indicated generally by the numeral 20.

The lower or sometimes called draft links 12 are arranged to be moved vertically usually by suitable power means which, as illustrated, comprises a pair (only one of which appears in the drawings) of lift arms 21 constrained for rotative movement with and secured one each to opposite ends of a rockshaft 22 and each of which arms, in turn, is connected by a drop or lift link 23 with a respective one of said draft links. The rockshaft 22 which extends transversely of the housing frame 11 has securedly affixed thereto a crank arm 24 through which said rockshaft is rocked to lift or lower the arms 21 by a hydraulic motor that includes a cylinder 25 and piston 26, with said piston and crank arm 24 being coupled by the connecting rod 27. Pressure fluid is supplied to the lift cylinder 25 from a suitable pump, such as indicated at 28, which, in turn, may be connected by conduits 29 and 30 with the flow of fluid to and from said cylinder controlled by an actuator control valve indicated generally at 31.

The pump 28 may be mounted within the housing frame 11 and a reservoir 30a may be fashioned as an interior compartment or chamber area formed as part of a housing embracing the hydraulic lift cylinder and the actuator valve therefor, as is well understood, hence, it is believed no further structural details thereof need be illustrated herein. Actuator control valve 31, which may be of conventional or well known construction, preferably, but of the type disclosed in U.S. Patent No. 2,716,- 966, issued September 6, 1955, to Clarence A. Hubert and Joseph F. Ziskal, and is operative selectively to permit delivery of fluid under pressure through a passage to one end of the lift cylinder while simultaneously opening another passage for escape of fluid to the reservoir from the opposite end of said cylinder in order to lift the lower draft links 12, and vice versa in order to lower said draft links, or to provide a neutral position wherein the passages to both ends of said cylinder are blocked and the associated circuit is closed.

Now, in accordance with the more specific teachings of the invention, according to one preferred embodiment as illustrated herein, the upper or top draft link 14 is fashioned with a forward link portion 14a pivotally mounted at 15 on the bracket 16 in turn suitably affixed to housing 11, and with its opposite end fixedly secured to the casing of an auxiliary hydraulic cylinder 32, while a rear link portion 14b pivotally connected at one end thereof to the upper end of a mast 17 has its opposite end connected to a piston 33 slidably operative within the cylinder 32. The rear link portion 14b thus functions, in effect, as a connecting rod for piston 33. Suitable sealing means, such as the rings shown at 34, may be provided in one end of cylinder 32 for cooperation with link connecting rod 14b, while, preferably, high-pressure flexible hose conduits 35, 36 are connected by suitable fittings 35a, 36a to respective ends of the upper link or auxiliary cylinder 32. The opposite ends of said flexible conduits are connected to suitable fittings such as 35b, 36b respectively, which, in turn, are connected by conduits 37, 38 to opposite end portions of a casing or housing 39 of a draft signaling control valve unit designated generally by the reference numeral 40.

Valve housing 39 is fashioned with a bore 41 extending longitudinally therethrough that slidably accommodates a relatively small-diameter piston 42 therewithin. One end or face of said piston has suitably affixed thereto and projecting therefrom guide rod 43, which extends through an aperture 44 in an end wall of valve housing 39 and has formed on the outwardly projecting end thereof an enlarged head or upset end portion 45 while a spring 46 coiled around said guide rod is abuttingly positioned between the head 45 and the proximate end wall of said valve housing. Suitable sealing means such as the rings 47 may be provided to restrict fluid flow along the guide rod 43 as is well understood. The opposite end or face of piston 42 has suitably affixed thereto and projecting therefrom a plunger member 48 which extends through an aperture 49 in an opposite end wall of said valve housing and has provided thereon proximate the outwardly projecting end portion thereof an abutment head or collar 50, while a coiled spring 51 seated on said collar and positioned over said plunger is compressibly reactive against the latter collar and the proximate end wall of housing 39. Suitable sealing means such as the rings 52 may be provided to limit fluid leakage axially along the plunger member 48. Extending upwardly from one side of valve casing 39 is a pedestallike portion or projection 53 and a plate-like support member 54 is removably secured to the outer end of said projection by suitable securing means such as the cap screws indicated at 55. Securedly positioned on the support member 54, by any suitable means such as the bolts 56, is a by-pass valve, operative to permit tilt adjustment of the implement and indicated generally at 57, which comprises a cylinder-like housing 58 with a bore 59 extending longitudinally therethrough and having oppositely disposed ports 60, 61, connected respectively, by conduits 62, 63 for by-pass or fluid communication with fittings 35b, 36b, and a piston 64 slidably disposed in said bore with a plunger rod 65 affixed to and extending upwardly from one end of said latter piston. A radial aperture 66 extending through piston 64 is provided for a purpose which will presently be further explained. A cover plate 67, with an opening 68 therethrough to accommodate plunger rod 65, may be suitably secured as by the bolts 69 to the upper end of cylinder housing 58, and a sealing ring 70 may be provided in said cover plate opening to restrict fluid leakage axially along said plunger rod. A coil spring 71 encircling plunger 65 is seatably positioned between the cover plate 67 and a stop collar or washer 72 positioned on said plunger and constrained, against axial movement in one direction, by a pin or cotter key such as 73 suitably secured in said plunger. The spring 71 is positionally dimensioned and stressed to normally urge piston 64 upwardly so that the aperture 66 therein is not in registering alignment with the oppositely disposed port openings 60 and 61 whereby the free flow of fluid between conduits 62 and 63 is restricted.

A shell-like housing or support structure indicated in its entirety by the reference numeral 75, may be fashioned to include an outer perimeter wall 76, an inner closure wall 77 to which said outer wall is affixed, and a plurality of lugs or brackets 78 adapted to receive fastening bolt means 79 whereby said structure may be mounted on a side wall portion of the vehicle housing frame 11. Said structure may, if desired, be provided as a container-like support for components of the proposed mechanism and a suitable cover plate (not shown) provided for covering the contents so as to protect them against excess exposure to dirt and debris. Suitable conventional mounting means, such as the brackets 40a and fastening bolt means indicated at 40b, may be provided for mounting the valve 40 and its associated components within said container structure, so that said structure along with its components may be added to the vehicle as a unit or package-like assembly.

The plunger rod 65 extends through an aperture 74 in the upper wall portion 76, of support structure 75, and a suitable sealing and lubricating gland or bushing such as indicated at 80 may be provided thereof as is well understood for such uses. The outwardly projecting end of plunger rod 65 engages a manually operable control or handle member 81 pivotally mounted at 82 on a bracket 83 supportably carried by and suitably affixed to the upper wall portion 76 of said support structure. The pivotal connection 82 may include any well-known friction or detent means (not shown) suitable for resisting movement of control handle 81 out of a preselected position except when manually motivated out of such position. Since such frictional and detent means are conventional and so well known for similar purposes, it was felt a full description of the structural details of a specific such means herein was unnecessary.

It will be appreciated, of course, that the bypass valve unit 57 could be fashioned as an integral part of the housing 39 without deviating from any of the inventive concepts hereof.

The outwardly projecting end of plunger member 48, of signaling valve 40, is fashioned with a recess or cut-away area 84 (FIG. 5) and has a stud or pin 85 mounted thereon which extends into said recessed area and pivotally supports a roller 86 retained on said pin by suitable means such as the cotter key or pin 87. Spaced axially outwardly from said stud and securedly affixed to plunger member 48 is a large-headed pin or stud 88, the head of which also extends into said cut-away area. The roller 86 and pin 88 as thus disposed serve as a cam follower and guide or cam operating means, as will subsequently be more fully understood.

A generally wedge-shaped plate-like cam member 89 with opposite edges contoured to provide cam profiles substantially as illustrated, has an over turned edge portion 90 providing a track that is dimensioned for positioning between the cam engaging roller 86 and guide pin 88 whereby movements of plunger 48 and cam 89 may be operatively coordinated in a positive cam and follower relationship. The cam-plate member 89 is fixedly secured to a vertically positioned support member 91 whose opposite ends have affixed thereto and extending transversely thereof upper and lower roller carrying brackets 92, 92a, respectively. Each of said roller carrying brackets has suitably supported thereon a pair of spaced-apart identical spindles or studs, such as indicated by the reference numeral 93, which, in turn, journals a respective roller member 94. An enlarged head or upset portion such as 94a suitably provided on the free end of each spindle serves to retain a respective roller member thereon. A cam member support frame, indicated generally at 95 (FIGURE 3), comprises an outer generally C-shaped member 96 and a smaller oppositely facing generally D-shaped inner member 97 (with one side thereof open) positioned therewithin, and affixed thereto by any suitable means such as the welds indicated at 98, with said members disposed so as to provide upper and lower tracks 99, 100 each of which slidably accommodates a set of two rollers 94. A support frame mounting and guide rod 101 has one end thereof suitably secured to said cam support frame for movement therewith while an opposite or upper end portion of said rod projects through an aperture 102 in upper wall portion 76, of housing structure 75, and a suitable sealing and lubricating gland or bushing such as indicated at 103 may be provided thereat as is well understood. The outwardly projecting end of guide rod 101 has a large-headed pin or stud 104 therein that serves as a cam follower and is positioned so that the head thereof extends into a cam guide track 105 fashioned in an arm of a manually operable control member or handle 107, in turn, pivotally mounted at 108 on the bracket 83. Cam guide track 105 may be contoured to provide the desired position relation for sensitivity lever 107 and, preferably, will be fashioned as a smooth curve except for detent notches 106 which serves to locate and maintain the No Effect zone of cam 89 in alignment with roller 117. It is understood, of course, that suitable friction means (not shown) or other suitable means for fixedly positioning the adjusted vertical locations of cam track 105 will be provided to normally maintain said control member in any rotatively selected position, as is well understood.

The opposite or forwardly facing end edge of cam member 89 has a lower edge portion thereof overturned to provide an inclined cam track 109, while disposed above said latter track is another track, indicated generally at 110 and designated as the draft control operating range portion or area of the mechanism, that is formed between the diverging ridge or rib members 111, 112 which, in turn, extend outwardly from the face of cam plate 89. Said ridges or ribs may be formed integral with said cam plate or separately fashioned and suitably secured to said cam member, as is well understood, without deviating from any teachings of the inventive concept hereof. As shown, the track 110 somewhat generally conforms in camming configuration, although it is not limited thereto, to the track profile provided by end edge portion 90, but it will be noted that the side walls of track 110 diverge so that the lower portion of the track is wider than the upper portion thereof for a reason which will presently become apparent. An actuator control rod 113 slidably mounted in an aperture 114 in perimeter wall 76 has one end thereof cut-away or recessed at 115 and a stud or pin 116 mounted thereon extends into said recessed area and pivotally supports a roller 117 suitably retained thereon. The roller 117, in turn, is positionable between the ridges 111, 112 and, under certain circumstances, adapted for contacting engagement with one or the other of said ridges or, with both of said ridges simultaneously, while at other times with cam track 109, and as thus engaged may be made to follow with varying degrees of control, the movements of said cam member; while at still other times, no engagement occurs with either of said tracks. A boss 118 provided on wall 76 adjacent aperture 114 includes an extension of said aperture for slidably accommodating the rod 113, and a threaded opening 119 in said boss receives a bearing shoe and a spring 121 held in place by a set screw 122. The spring 121 urges bearing shoe 120 into frictional engagement with the rod 113 while the set screw 122 is adjustable to vary the degree of such frictional engagement, all for purposes which will presently be readily understood.

The actuator control valve 31 which may be conventional in structure, preferably, is of the type disclosed in the noted U.S. Patent No. 2,716,966 and wherein, as illustrated in the present invention, the lift cylinder 25 and the actuator control valve 31 are disposed in close proximity to one another in a casing-like structure such as is represented herein by the reference numeral 130. Since the operation of the control valve and lift cylinder of the present invention is substantially identical to that disclosed in the above referenced U.S. patent no further elaboration of the structural details thereof need be included herein. In the instant invention the actuator control rod 113, which constitutes a part of the signal input means to the actuator control valve, is normally directly operative responsive to movements of the cam member 89 instead of to the operator's control handle as is the case in said patent structure, otherwise the functioning of the two structures is identical.

It will be apparent to those skilled in the art that an actuator control valve, such as indicated at 31, of the type disclosed in the previously referenced U.S. Patent No. 2,716,966 is readily adaptable to provide for admission of fluid into only one end of the lift cylinder 25 in order to raise the implement, while depending upon the weight of the implement to effect the lowering thereof, without deviating from any of the fundamental teachings of the present invention. In such event, it will be understood, certain modifications would also be made in the cam member 89 as presently illustrated in order to coordinate the movements thereof with the operation of valve 31, all of which is well within the purview and bounds of the present invention.

The opposite or outwardly extending end of rod 113 is connected to a head 123 which is pivotally mounted at 124 on a walking beam link member 125 proximate one end of said link. The opposite end of said walking beam link is pivotally connected at 126 to a bracket 127 constrained for movement with the lift cylinder connecting rod 27. Intermediate the ends thereof the walking beam link 127 is pivotally connected at 128 to the outwardly projecting end of the control element spool or plunger 129 of the actuator control valve 31.

A pressure relief and bleed valve, indicated in its entirety at 131, is connected by conduit 132 to a port 133 opening into bore 41 while the opposite end of said valve communicates by conduit 134 with a hydraulic fluid supply reservoir indicated herein at 30a in housing 130. It will be appreciated, of course, that any other suitable fluid supply reservoir on the vehicle could be used for this purpose. Relief valve 131, which is generally conventional in structure, includes a ball member 135 that engages a valve seat 136 and is urged thereagainst by a spring 136a which spring is stressed so as to constantly permit a small amount of fluid from bore 41 to bleed past the seat 136 under normal operating conditions, but will permit full flow exhaust into the reservoir when excess pressure occurs in the latter bore as is well understood.

A combination fluid make-up and surge restricting valve means, indicated generally at 137, communicates by way of a port passage 138 opening into bore 41 and by way of conduit 139 with the pressure side of pump 28. A casing 140 having a bore 141 therein accommodates a ball 142 which may engage either one or the other of oppositely facing valve seats 143, 144 fashioned therewithin, and a plunger 145 has one end thereof adapted to engage said ball while the opposite end of the plunger is affixed to a cruciform-shaped spider 146 having a small guide plunger 147 on the opposite side thereof. A spring 148 positioned around plunger 147 seats against spider 146 and one end of casing 140, while an aperture in said casing is aligned and coterminous with port opening or passage 138. Suitable means (not shown) will, of course, be provided for affixing the make-up valve 137 to the draft signaling valve 40 when they are separately fashioned. It will be appreciated, also, that the casings of these valves may be integrally fashioned as well without deviating from any of the inventive concepts hereof. During normal operation the spring 148 is stressed to permit the pressure in conduit 139 to cause the ball 142 to assume a position out of engagement with the valve seats 143 and 144 and thereby allow fluid from pump 28 to flow into bore 41. When this area is filled and no additional make-up fluid is required the excess will bleed off to the reservoir through the combination bleed and relief valve 131. However, in the event a surge occurs in the main hydraulic circuit being supplied by pump 28 the excess pressure thus created will cause ball 142 to engage valve seat 143 and prevent this excess surge pressure being transmitted into bore 41. On the other hand, when a surge occurs in bore 41 ball 142 engages valve seat 144 and closes off conduit 139 to this excess surge pressure. Also, when the pressure in the charging circuit 139 falls below normal, ball 142 will seat against valve seat 144 and thus prevent loss of fluid from the closed circuit embracing bore 41. Such pressure decrease will also permit relief valve 131 to close and stop fluid bleeding until the charge pressure has returned to normal. Any loss of fluid in flexible conduit 35, conduit 36 and the opposite end of bore 41 can be made up by momentarily opening the by-pass valve 57. This arrangement, it will be appreciated, permits the proposed hydraulic draft sensing mechanism circuit to be tied into the main fluid charging circuit of a vehicle without requiring the use of a separate fluid pressure supply for the draft sensing circuit. If desired however, a separate fluid pressure supply might be provided for said draft sensing circuit in which case the valve 137 would be unnecessary and could be replaced with a conventional unidirectional type of check valve that would permit only the inflow of fluid to the draft signaling valve 40.

In FIGURES 6-7 there is illustrated a modified application of the proposed implement depth control mechanism. The modification therein is directed to the environmental application illustrated and is particularly related to the adaptation of the proposed control mechanism to a different form of earth-working implement and to the trail-behind hitch mechanism employed for attaching implements of that particular type to its associated vehicle. In the modification, parts and elements identical to those of the initially described preferred form, shown in FIGURES 1-5, have been referenced with the same reference numerals employed therewith, while comparable parts or components which although similar are not identical are referenced generally with similar reference numerals, whenever feasible, but in the 200 series of numerals.

In the modified arrangement the tractor vehicle 10 includes a rear axle and differential housing frame portion 11 to which is affixed at opposite sides thereof, by suitable means such as the bolts 213, a U-shaped fixed drawbar 212. Apertures 212a spaced along the transverse portion of said drawbar are provided to accommodate the pin portion 215a of a universal pivotal connection 215 and said pin may be retained in position by suitable lynch pin means such as shown at 215b. A draft link assembly 14 has a forward link portion 14a that has one end thereof attached to the fixed drawbar 212 by means of the universal pivotal connection 215 while the opposite end of said link portion is fixedly secured to the casing of an auxiliary cylinder 32, and a rear link portion 14b is connected at one end to a piston 33 slidably operative within cylinder 32 while the opposite end of said portion is pivotally connected at 14c to a tool bar frame indicated in its entirety at 218. It will be understood, of course, that the latter connection could be of the universal type if desired without deviating from any of the teachings of the present invention. The universal pivotal connection 215 is arranged to permit full pivotal movement of the draft link 14 in a horizontal plane and incidental movement in a vertical plane, while the pivotal connection 14c permits full vertical movement of the tool bar frame 218 relative to said draft link and, when said latter connection is of the universal variety, incidental movement in a horizontal plane.

Suitably attached, as by the detachable connecting or clamping means indicated generally at 219, to and depending from the frame 218 are a plurality of transversely spaced-apart subsoiler implements shown generally by reference numeral 220. A transversely extending tubular rockshaft member 222 is journaled at opposite ends thereof by suitable means such as the journal brackets 222a (only one of which is shown) mounted on the frame 218 and attached thereto by bolt means 222b. Affixed to and extending from the rockshaft 222 are a pair (only one of which appears) of transversely spaced wheel-carrying lift crank arm members 223 each of which rotatably mounts a support wheel 223a. A crank member 224 mounted by suitable affixing means on rockshaft 222 extends upwardly therefrom and is pivotally connected by the pivotal clevis means indicated at 224a to the outwardly projecting end of the lift cylinder connecting rod 27, which is previously described, is connected to the piston slidably mounted in the lift cylinder that comprises the hydraulic actuator motor which is actuable for rocking shaft 222 and thereby raising and lowering the associated subsoiler implements 220.

The hydraulic actuator motor, as previously mentioned, along with the actuator control valve therefor are included in the unit assembly indicated generally at 130 and which is connected by the flexible conduits 29 and 30 to the hydraulic pump indicated at 28. The draft signaling control valve mechanism along with the sensitivity adjusting and motion-transmitting camming means plus the appropriate controls therefor are included, as previously described, in the shell-like housing or support structure, indicated by the reference numeral 75, and is communicatively connected to the auxiliary cylinder 32 by way of the flexible high-pressure conduits 35 and 36. A plate-like bracket or platform support member 225 carried by the tool bar frame 218, and secured thereto by suitable fastening means such as the bolts and nuts indicated at 225a, may be provided to supportably mount the units 75 and 130 thereon while any well known mounting means such as the brackets and bolts indicated at 225b may be utilized to affix said units securely thereon.

As previously described the actuator control rod 113 extending outwardly from the unit 75 pivotally connects with the walking beam link member 125 which, in turn, pivotally connects with the plunger 129 of the actuator valve and with the lift cylinder connecting rod 27.

*Operation*

In operation, manual movement of the control handle 107 in either direction will, under certain positions of cam member 89, incur a corresponding movement of the piston 26 of the hydraulic motor or ram cylinder 25. For instance, a forward or upward movement of the upper end of control handle 107 will, acting through the cam track 105 and cam follower pin 104, cause vertical downward movement of guide rod 101 and its attached cam support frame 95 which carries with it the cam member 89. Since the cam 89 is restricted against rearward lateral movement by the spring 51, of draft signaling valve 40, and when the cam member 89 is in the draft control operating range thereof and hence at an elevation such as to permit the ridge 111 of cam track 110 to close the gap therebetween and then engage follower roller 117 this will effect forward movement of the actuator control rod 113 which thereupon causes counterclockwise swinging of the walking beam 125 about the then fixed pivot 126 and endwise movement of the actuator control valve spool or plunger element 129 forwardly or to the right as viewed in FIGURE 2. This forward movement of said control valve element will cause fluid to be introduced into the right end of cylinder 25, in a manner readily understood from a perusal of the operation of said referenced U.S. patent, whereupon the piston 26 is moved rearwardly to raise or lift the attached implement and carrying with it the upper end of walking beam 125 and in this manner causing said walking beam link to pivot about its then fixed pivot 124 until the actuator control valve spool or plunger is moved rearwardly and returned to its initial or neutral position.

Movement of the control handle 107 counterclockwise under similar conditions and with cam member 89 in its draft-control range, will cause a vertical upward movement of guide rod 101 and its associated cam support frame 95 together with said cam member. Since cam member 89 is restricted against free lateral movement by spring 46, of signaling valve 40, and with said cam member at an elevation to permit such engagement, and since cam track 90 inclines rearwardly said cam member will move laterally rearwardly on rollers 94 as it is elevated, whereupon ridge 112 of cam track 110 after closing any gap between said ridge and its engageable follower roller 117 will effect a rearward movement of the actuator rod 113 which thereupon causes a clockwise swinging of the walking beam 125 about the then fixed pivot 126 and endwise movement of the control valve spool control element 129 rearwardly or to the left, as viewed in FIGURE 2. This rearward movement of the valve control element will cause fluid to be introduced into the left end of the cylinder 25 whereby the piston 26 is moved forwardly to lower or drop the implement and carrying with it the upper end of walking beam link 125 and in this manner causing said walking beam link to pivot about its then fixed pivot 124 until the control valve spool or plunger is moved forwardly and returned to its initial or neutral position.

Normally the by-pass or tilt valve 57 is positionably conditioned for restricting free flow of fluid therethrough with the components thereof being disposed substantially as illustrated in FIGURE 2. However, in the event it becomes desirable to utilize this advantageous and simple feature of the invention for adjusting the tilt or angular displacement of the implement, as illustrated in FIGURES 1 and 2, the control handle 81 is manually manipulated to move the plunger rod 65 downwardly against the reaction of spring 71 thereby effecting a positioning of aperture 66, in piston 64, into registering alignment with port openings 60 and 61 so as to permit free fluid communication, by way of conduits 62, 63 between opposite sides of cylinder 32 in the upper link 14. Under this condition said upper link may be readily adjusted by manual movement thereof to any preselected length required to provide the desired implement tilt. When the desired length for link 14 has been attained control handle 81 is returned to its initial position whereupon spring 71 reacts to raise piston 64 to its original position and in so doing interrupts fluid communication between ports 60 and 61, thus causing the elements of link 14 to tend to function as a substantially rigid non-yielding member instead of as a telescoping structure upon application thereto of tension and compression forces by the attached implement.

Assume now that the implement has been lowered to its desired working depth in the soil whereupon the draft thereof will be balanced against the difference in forces set-up thereby between opposite faces of the piston 42, in valve 40, and said implement will continue to function at the selected depth so long as the draft load thereon does not vary. Upon encountering a variation in soil density or some other circumstance which causes an increase in draft load, the implement will tend to swing upwardly either about the pivots 13 or about the pivotal connections of mast 17 with the lower draft links 12. This action produces a forward movement of the rear link portion 14b which thereupon tends to telescopingly compress upper link 14. This results in an increased compressive force in said upper link which thereupon tends to urge piston 33, of cylinder 32, forwardly or to the right as viewed herein, thus forcing fluid from the right end of said cylinder through conduits 35, 37 into the left end of bore 41, of valve 40, where such fluid reacts against the left face of piston 42 endeavoring to overcome the reactive resistance thereto of spring 46 and the reaction of the fluid on the opposite face of piston 42. However, since the pressure in conduits 36, 38 is simultaneously reduced upon an inward movement of piston 33 the difference in pressure between opposite ends of said cylinder thus becomes effective to accomplish movement forwardly, or to the right, of piston 42 within the bore 41 and likewise of its attached plunger member 48.

Since the effective diameter or exposed face or pressure area of piston 33 is much greater than the corresponding face of piston 42 this results in an increased mechanical advantage whereby a very small lateral movement of piston 33 produces an appreciable correlated lateral movement of piston 42. This feature is particularly advantageous since it permits a very small as well as a large change in draft to be readily sensed and registered and subsequently reflected by way of a much greater lateral movement in the signal transmitting elements of the device, thus the device is made materially more sensitive and susceptible for sensing and correcting for small as well as large variations in the draft load. Inasmuch as the roller 86 and pin 88 on the end of plunger 48 are in contacting engagement with opposite faces of track 90, of cam member 89, and vertical movement of said cam member restrained by the frictional holding means of handle 107, any lateral movement of plunger 48 will incur a comparable movement of said cam member. When the cam member 89 in the draft control range thereof has traveled a horizontal distance sufficient to close any gap between follower roller 117 and ridge 111, of cam track 110, said roller will pick-up the signaling movement being transmitted through cam member 89 and transmit it by way of actuator control rod 113 to the actuator control valve 31. In the present instance, this will cause walking beam link member 125 to swing counterclockwise about pivot 126 thereby effecting a lifting or raising of the implement which thereupon causes a decrease in the draft on said implement.

In a similar manner when a condition is encountered which results in a decrease in draft load the implement tends to swing downwardly or rotate counterclockwise about its pivotal connections. This produces a rearward movement of the rear link portion 14b which thereupon tends to elongate or stretch the upper link 14 and incident thereto to place said link in tension. This action tends to urge piston 33, of cylinder 32, rearwardly, or to the left as viewed herein, thus forcing fluid from the left end thereof through conduits 36, 38 and into the right end of bore 41, of valve 40, where such fluid reacts against the right face of piston 42 endeavoring to overcome the reactive resistance thereto of spring 51 and the reaction of the fluid on the opposite face of said piston. Since the pressure in conduits 35, 37 is concomitantly reduced upon such movement of piston 33 the difference in pressure between opposite ends of said cylinder thus becomes effective to accomplish movement rearwardly of piston 42 and its attached plunger member 48. Since roller 86 and pin 88 on plunger 48 are in engaging contact with opposite sides of track 90, of cam member 89, which is restrained against vertical movement, any lateral movement of plunger 48 will incur a similar movement of said cam member. With cam member 89 in the draft control range thereof, when the gap between roller 117 and ridge 112, of cam track 110, has been closed said roller will then pick-up the signaling movement being transmitted thruogh cam member 89 and transmit it by way of actuator control rod 113 to the actuator control valve 31. In this instance, such movement will cause walking beam 125 to swing clockwise about pivot 126 thereby effecting a lowering or dropping of the implement which thereupon reestablishes the desired draft load on said implement.

The operation of the modified arrangement illustrated in FIGURES 6 and 7 is generally similar to the embodiment shown in FIGURES 1–5. As heretofore explained in detail, in describing the operation of the preferred form illustrated in FIGURES 1–5, the control handle 107 may be rotated to cause actuation of the lift cylinder for rocking rockshaft wheels 223a and in that way conversely lower and raise the earth-working implement 220 to vary the depth thereof in the ground. Now assume, as before, that the implement 220 has been lowered to its desired working depth in the soil and the draft load thereon balanced against the difference in forces set up thereby between opposite faces of the piston in the draft signaling valve contained within the unitary assembly 75, whereupon said implement will continue functioning at the selected depth until encountering a variation in draft load thereon. Upon encountering an increase in draft load, the implement while tending to swing or pivot about its pivotal connection 14c will at the same time tend to elongate the draft link 14 by producing a rearward movement of the rear link portion 14b thereof. Since link portion 14b is constrained for movement with piston 33 a rearward movement of said piston operates to force fluid from the left end of auxiliary cylinder 32 out through conduit 35 and into one end of the draft signaling valve contained in unit 75 where, as previously related, this produces an increase in pressure in one end of the valve and causes a forward movement of the plunger thereof. This latter movement, in turn, produces a forward movement of actuator control rod 113 which transmits such movement signal by way of the interconnected spool plunger 129 to the actuator control valve in unit 130 which then responds to actuate the hydraulic lift cylinder and to lower the support wheels 223a and thereby raise the implement so as to decrease the draft load thereon. It will be apparent from the above that in the modified arrangement an increase in draft load produces a rearward movement of piston 32 in auxiliary cylinder 33 whereas in the other preferred embodiment such increase produces a forward movement thereof, but this is readily compensated for by reversing the conduit connections 35 and 36 between the cylinder and unit 75 without deviating from any fundamental teachings of the invention.

Next assume a condition which results in a decrease in draft load. In this case the rearward urging of the implement is decreased whereupon the fluid pressure in the left end of auxiliary cylinder 32 is able to react and effect a forward movement of piston 33 and hence a shortening of draft link 14. This movement produces an outflow of fluid from the forward end of said auxiliary cylinder by way of conduit 36 into the forward end of the draft signaling valve which thereupon produces an increase in pressure in this end of said valve and such increase causes a rearward movement of the plunger thereof. Said latter movement, in turn, causes a rearward movement of actuator control rod 113 which transmits such movement signal by way of the interconnected spool plunger 129 to the actuator control valve in unit 130 which then responds to actuate the hydraulic lift cylinder and to raise the support wheels 223a and thereby drop the implement so as to re-establish the desired draft load on said implement.

It will be seen from the foregoing that the proposed mechanism is highly effective for maintaining a substantially constant draft load on the implement, and because of the mechanical advantage developed therein provides an apparatus that is highly sensitive for registering and correcting for implement draft variations of minimum as well an maximum magnitudes. It will also be appreciated that a very simple means has been incorporated in the mechanism for adjusting the length of the upper link of the hitch and concomitant therewith altering the angle or tilt of an implement in the soil.

It will be noted that the opposite ridges 111, 112 of cam track 110 diverge from one another so that the lateral dimension of cam track 110 changes considerably from one end to the other thereof, and that only adjacent the upper end thereof does the roller 117 contactingly engage both said ridges at the same time. The purpose of this arrangement is to provide for variation in the degree of sensitivity or magnitude of draft load change required to effect response of said mechanism. For instance, when the cam track 110 is in such position that both sides thereof simultaneously contact roller 117 any lateral movement of cam member 89 will immediately be transmitted to the control valve 31 to effect an appropriate correction in the elevation of the attached implement. However, there are circumstances when, because of frequent irregularities of ground contours or frequent changes in soil density or other similar conditions, it becomes desirable to provide variable sensitivity or varying degrees of magnitude of draft load change to effect response of the device in order to reduce the frequency of corrections being effected. This is readily accomplished in the present invention merely by rotating the control handle 107 and thereby changing the elevation of the cam member 89. This has the effect of modifying the point of engagement of the roller 117 with the appropriate ridge of cam track 110 and thereby providing in effect a lost-motion connection therebetween. By decreasing the gap or spacing between the roller 117 and its respective engaging ridge member the sensitivity is increased or magnitude of draft load change required to effect response is decreased, and, conversely, by increasing this gap or spacing the sensitivity is decreased or magnitude of draft load change required to effect response is increased.

Referring to FIGURE 2 of the drawings, it will be seen that an intermediate portion of the right hand side of cam member 89 is devoid of any cam or ridge member that is engageable with roller 117. This is termed the "No Effect" zone or null area and when the cam member 89 is so positioned that roller 117 rests in this "No Effect" zone any lateral movement of said cam member will produce no comparable movement of said roller, hence the control valve 31 will not be operatively responsive to such movements. The friction bearing shoe or block 120 creates a friction on actuator rod 113 which resists axial movement of said rod which is such that it can be overcome by movement of cam member 89 but cannot be overcome by movement of the walking beam member 125. This, of course, is particularly useful when the roller 117 is disposed in the "No Effect" zone of cam member 89.

The cam track 109 provides a manual over-ride means for lowering the implement. When the cam member 89 has been raised to a position such that the roller 117 is disposed in the "No Effect" zone of said cam member the vertical alignment thereof will be such that the lower edge of ridge 112 of track 110 may, under some circumstances of draft load or the last used lift position, interfere with a lowering of the cam member 89 when it is desired to reposition said roller within the draft control range of cam track 110. Hence, in order to accomplish this the cam member 89 is first raised by control handle 107 until roller 117 engages track 109 and moves said roller leftwardly a distance sufficient to permit its re-entry into cam track 110 when said cam member is subsequently lowered by manipulation of said control handle.

Although only preferred embodiments, which show the invention utilized in association with an upper link element of a hitch linkage, and with a draw-bar type single point linkage have been illustrated and described herein, it will be appreciated that it is not limited to such application since it may readily be applied to lower link elements as well as to other draw-bar types of hitch installations with equal facility without deviating from any teachings of the inventive concepts hereof.

Variants in individual components of the mechanism disclosed will readily occur to skilled designers in the field. Accordingly, even though a particular embodiment and application of the invention has been shown and described in some detail, there is no intention to thereby limit the invention to such specific form or the particular employments here indicated. On the contrary, the intention is to cover all modifications and alternative arrangements falling within the spirit and scope of the present invention as expressed in the appended claims.

What is claimed is:

1. In a vehicle and ground-working implement arrangement with each having a supporting framework, and hitch means connecting said frameworks in draft-receiving and transmitting relation, the combination of draft sensing means telescopingly mounted on said hitch means and including an auxiliary piston and cylinder operative for creating pressure differentials between opposite ends thereof in response to draft-produced changes in stress in the hitch means, said hitch means including a linkage member pivotally connected at a forward end thereof to the vehicle framework for movement in a horizontal plane and pivotally connected at a rearward end thereof to the implement framework thereby to accommodate vertical movement of the implement relative to the linkage member, a hydraulic actuator mounted on one of said supporting frameworks and operative for raising and lowering the associated implement, said actuator including control valve means actuable for controlling the operation thereof, draft-signaling means mounted on one of said frameworks, conduit means communicatively interconnecting said draft-sensing and said draft-signaling means and including hydraulic fluid therein, said draft signaling means having means therein variably positionable in accordance with the pressure differentials created between opposite ends of said auxiliary cylinder as a result of variations in draft load imposed on the tractor by the attached implement, and movement-transmitting means interconnected between said draft-signaling means and said actuator control valve means and operatively responsive to movements of said variably positionable means for actuating said actuator control valve means to selectively effect a raising and lowering of the attached implement and thereby to maintain a substantially constant draft thereon.

2. In a vehicle and ground-working implement arrangement with each having a supporting framework, and hitch means connecting said frameworks in draft-receiving and transmitting relation, the combination of a draft sensing means telescopingly mounted in said hitch means intermediate opposite ends thereof and exteriorly of the vehicle and including expandable and contractible hydraulic motor means operative for creating pressure differentials proportional to the draft load between opposite ends thereof in response to draft-produced changes in stress in the hitch means, said hitch means including a linkage member pivotally connected at a forward end thereof to the vehicle framework for movement in a horizontal plane and pivotally connected at a rearward end thereof to the implement framework thereby to accommodate vertical movement of the implement relative to the linkage member, a hydraulic actuator mounted on one of said supporting frameworks and operative for raising and lowering the associated implement, said actuator including control valve means actuable for controlling the operation thereof, draft-signaling means mounted on one of said frameworks, conduit means communicatively interconnecting said draft-sensing and said draft-signaling means and including hydraulic fluid therein, said draft-signaling means having means therein variably positionable in accordance with the pressure differentials created between opposite ends of said hydraulic motor means as a result of variations in draft load imposed on the tractor by the attached implement, and movement-transmitting means interconnected between said draft-signaling means and said actuator control valve means and operatively responsive to movements of said variably positionable means for actuating said actuator control valve means to selectively effect a raising and lowering of the attached implement and thereby to maintain a substantially constant draft thereon.

3. In a vehicle and ground-working implement arrangement with each having a supporting framework and being interconnected, the combination of a draft sensing means having one end thereof pivotally connected to the vehicle framework and another end thereof pivotally connected to the implement framework, and being telescopingly operative in draft receiving and transmitting relation therebetween, said sensing means including expandable and contractible hydraulic motor means operative for creating pressure differentials proportional to the draft load between opposite ends thereof in response to draft-produced changes in stress in said sensing means, a hydraulic actuator mounted on the implement framework and operative for raising and lowering the associated implement, said actuator including control valve means actuable for controlling the operation thereof, draft-signaling means mounted on one of said frameworks, conduit means communicatively interconnecting said draft-sensing and said draft-signaling means and including hydraulic fluid therein, said draft-signaling means having means therein variably positionable in accordance with the pressure differentials created between opposite ends of said hydraulic motor means as a result of variations in draft load imposed on the tractor by the attached implement, and movement-transmitting means interconnected between said draft-signaling means and said actuator control valve means and operatively responsive to movements of said variably positionable means for actuating said actuator control valve means to selectively effect a raising and lowering of the attached implement and thereby to maintain a substantially constant draft thereon.

4. The invention according to claim 3 and further characterized in that the draft-signaling means is mounted on the implement framework in close association with the control valve means of said hydraulic actuator.

5. The invention according to claim 3 and further characterized in that said draft sensing means constitutes the sole draft-receiving and transmitting connection between the vehicle and implement frameworks.

6. In a vehicle and ground-working implement arrangement with each having a supporting framework and being interconnected, the combination of a draft sensing means having one end thereof pivotally connected to the vehicle framework and another end thereof pivotally connected to the implement framework and being telescopingly operative in draft receiving and transmitting relation therebetween, said sensing means including expandable and contractible hydraulic motor means operative for creating pressure differentials proportional to the draft load between opposite ends thereof in response to draft-produced changes in stress in said sensing means, a hydraulic actuator mounted on the implement framework and operative for raising and lowering the associated implement, said actuator including control valve means actuable for controlling the operation thereof, draft-signaling means mounted on one of said frameworks, conduit means communicatively interconnecting said draft-sensing and said draft-signaling means and including hydraulic fluid therein, said draft-signaling means having means therein variably positionable in accordance with the pressure differentials created between opposite ends of said hydraulic motor means as a result of variations in draft load imposed on the tractor by the attached implement, and movement-transmitting means interconnected between said draft-signaling means and said actuator control valve means and operatively responsive to movements of said variably positionable means for actuating said actuator control valve means to selectively effect a raising and lowering of the attached implement and thereby to maintain a substantially constant draft thereon, and means including a by-pass valve communicatively connected between opposite ends of said hydraulic motor means and manual means for operating said by-pass valve to establish free fluid communication between the opposite ends of said hydraulic motor means whereby the effective length of said draft sensing means of which said hydraulic motor means forms a part may be varied.

7. The invention according to claim 3 further characterized in that said movement-transmitting means includes lost motion means and means for adjusting said latter means whereby said lost means is positionably adjustable to a position such that no movement of the variably positionable means are transmitted to said control valve means, and further in that said movement-transmitting means includes manually adjustable means operative to effect actuation of said actuator control valve means to cause a raising and lowering of the attached implement independent of movements of the variably positionable means of said draft-signaling means.

8. In a vehicle and ground-working implement arrangement with each having a supporting framework and being interconnected, the combination of a draft sensing mechanism having one end thereof pivotally connected to the vehicle framework and another end thereof pivotally connected to the implement framework, and being telescopingly operative in draft receiving and transmitting relation therebetween; said sensing mechanism including expandable and contractible hydraulic motor means operative for creating pressure differentials proportional to the draft load between opposite ends thereof in response to draft-produced changes in stress in said sensing mechanism; a hydraulic actuator mounted on the implement framework and operative for raising and lowering the associated implement; said actuator including control valve means actuable for controlling the operation thereof; a hydraulic displacement device supportably carried by the implement framework and fashioned to provide a bore therein and having a piston variably positionable within said bore, and having a plunger portion of said piston extending outwardly of said device; conduit means including a supply of hydraulic fluid therein communicatively interconnecting opposite ends of said hydraulic motor means and said bore; said displacement device piston and plunger being variably positionable in said bore in accordance with the pressure differentials created between opposite ends of said hydraulic motor means; motion transmitting means connected with the outwardly extending plunger portion of said displacement device piston and with said actuator control valve means and operative for transmitting the variably positionable movements of said piston and plunger within said bore to said actuator control valve means for actuating said latter means to effect through operation of said hydraulic actuator a raising and lowering of the attached implement to thereby maintain a substantially constant draft on the implement.

9. In a vehicle and ground-working implement arrangement with each having a supporting framework and being interconnected, the combination of a draft sensing mechanism having one end thereof pivotally connected to the vehicle framework and another end thereof pivotally connected to the implement framework, and being telescopingly operative in draft receiving and transmitting relation therebetween; said sensing mechanism including expandable and contractible hydraulic motor means operative for creating pressure differentials proportional to the draft load between opposite ends thereof in response to draft-produced changes in stress in said sensing mechanism; a hydraulic actuator mounted on the implement framework and operative for raising and lowering the associated implement; said actuator including control valve means actuable for controlling the operation thereof; a hydraulic displacement device supportably carried by the implement framework and fashioned to provide a bore therein and having a piston variably positionable within said bore, and having a plunger portion of said piston extending outwardly of said device; conduit means including a supply of hydraulic fluid therein communicatively interconnecting opposite ends of said hydraulic motor means and said bore; said displacement device piston and plunger being variably positionable in said bore in accordance with the pressure differentials created between opposite ends of said hydraulic motor means; motion-transmitting means interposed between said hydraulic displacement device and said actuator control valve means and including manually adjustable cam means, and means interconnecting the outwardly extending plunger portion of said displacement device with said cam means, link means connected at one end thereof to said actuator control valve means and having another end thereof disposed for contacting engagement with said cam means, said cam means being adjustable to a plurality of positions in certain of which positions said cam means is effective for transmitting movements of the variably positionable piston of said hydraulic device to said actuator control valve means for actuating said latter means to effect a raising and lowering of the attached implement to thereby maintain a substantially constant draft on the implement and in certain other positions thereof said cam means is effective for interrupting the transmission of movements between said variably positionable piston and said actuator control valve means.

References Cited by the Examiner
UNITED STATES PATENTS 2,754,742    7/1956    Altgelt _____ 172—9
2,974,733    3/1961    Fletcher _____ 172—7

ABRAHAM G. STONE, *Primary Examiner.*

R. L. HOLLISTER, *Assistant Examiner.*